United States Patent [19]

Yoshida

[11] Patent Number: 5,054,642

[45] Date of Patent: Oct. 8, 1991

[54] LID DEVICE FOR WIDE-MOUNTED CONTAINER AND METHOD OF PRODUCING THE SAME

[75] Inventor: Yoshiaki Yoshida, Nara, Japan

[73] Assignee: Tenryu Chemical Industry Co., Ltd., Nara, Japan

[21] Appl. No.: 426,012

[22] Filed: Oct. 24, 1989

[30] Foreign Application Priority Data

Mar. 15, 1989 [JP] Japan .................... 1-30204[U]
May 18, 1989 [JP] Japan .................... 1-125657

[51] Int. Cl.⁵ ............................................ B65D 17/40
[52] U.S. Cl. ............................. 220/276; 220/269; 220/270; 220/359; 220/521; 220/524
[58] Field of Search ............... 220/257, 269, 270, 271, 220/272, 273, 276, 359, 503, 505, 506, 521, 523, 524

[56] References Cited

U.S. PATENT DOCUMENTS

| | | |
|---|---|---|
| 3,184,096 | 5/1965 | Cheeley . |
| 3,494,500 | 2/1970 | Foster . |
| 4,165,016 | 8/1979 | Moller ........................ 220/270 |
| 4,212,409 | 7/1980 | Jeppsson ..................... 220/276 |
| 4,674,649 | 6/1987 | Pavely ........................ 220/271 |
| 4,738,374 | 4/1988 | Ingemann .................... 220/258 |

FOREIGN PATENT DOCUMENTS 0220820 5/1987 European Pat. Off. .

Primary Examiner—Stephen Marcus
Assistant Examiner—Nova Stucker
Attorney, Agent, or Firm—William H. Eilberg

[57] ABSTRACT

A lid device for a wide-mouthed container comprises a metallic lid body having an inner margin defining an opening of a predetermined shape, and a closure member made of a soft synthetic resin for closing said opening of said lid body. The closure member is integrally formed with a pull tab used to open the closure member along a weakening line. The entire outer surface of the closure member is covered by a vapor impervious film, so that passage of water vapor through the lid device can be prevented even if the closure member itself is vapor pervious.

16 Claims, 5 Drawing Sheets

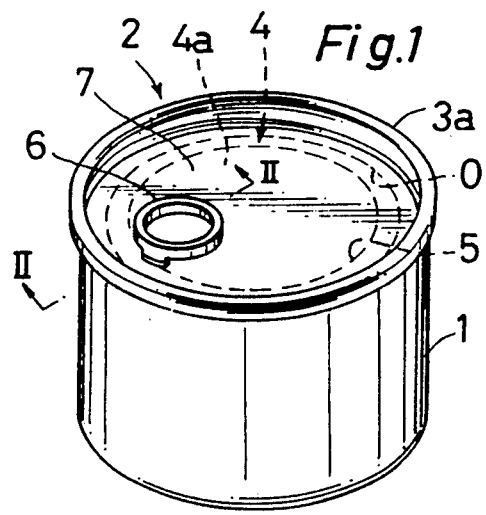
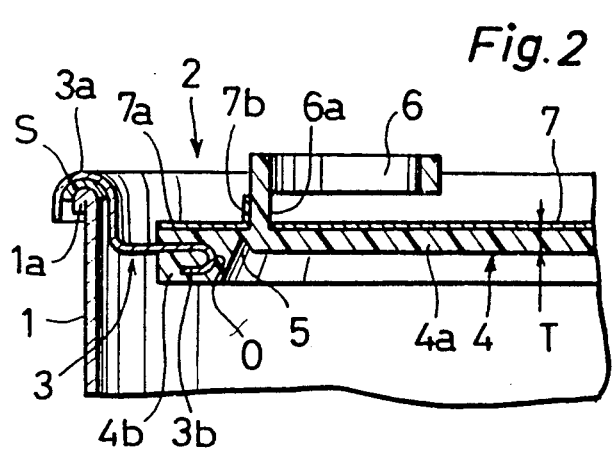
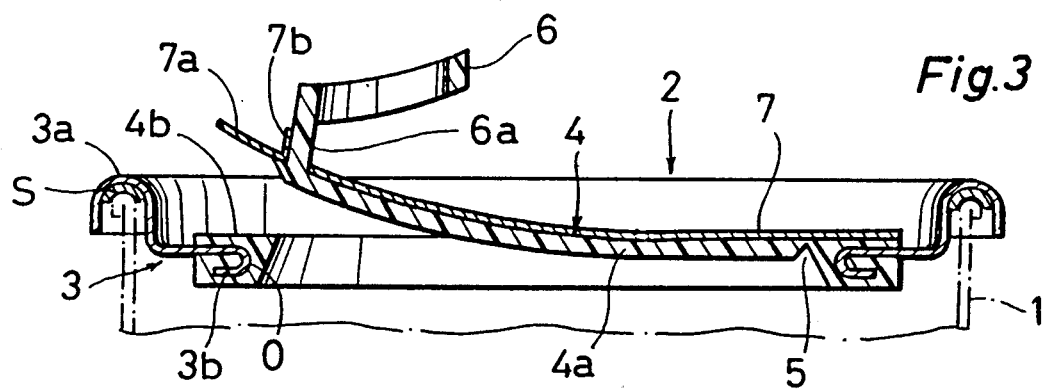
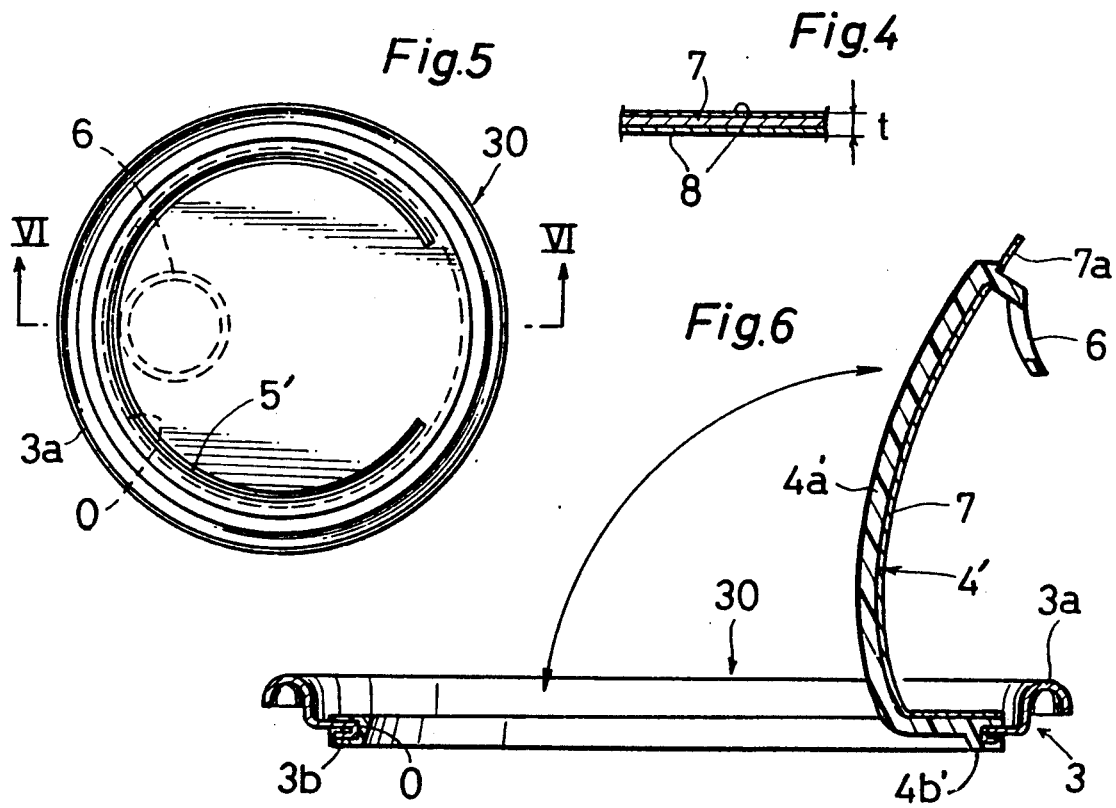

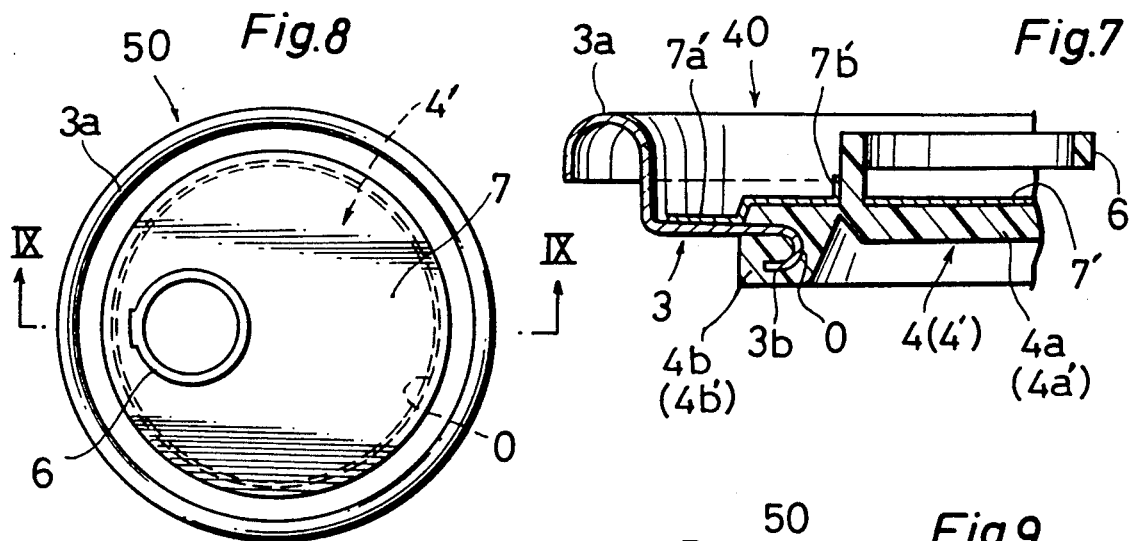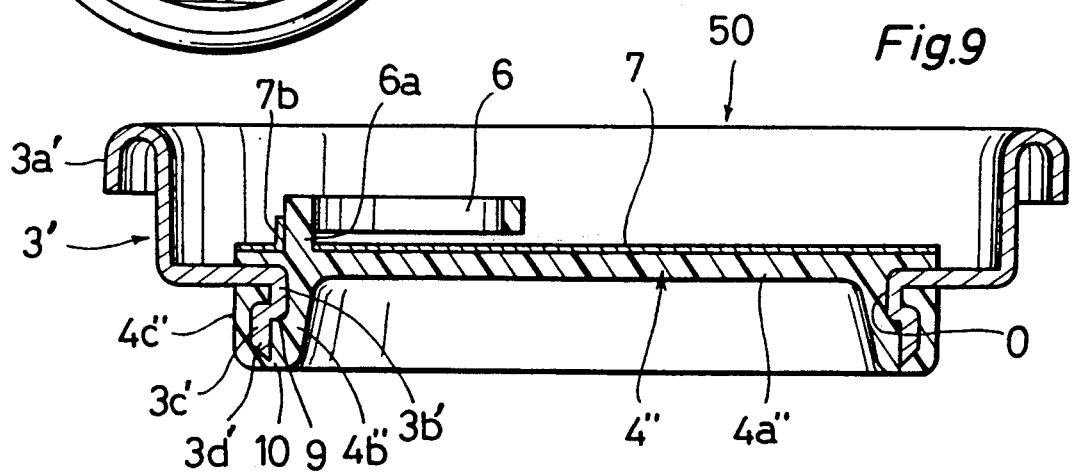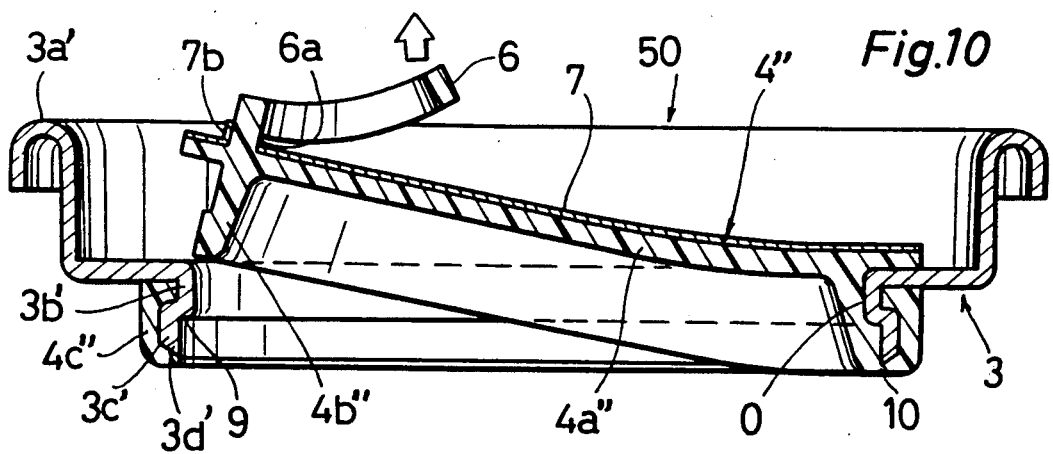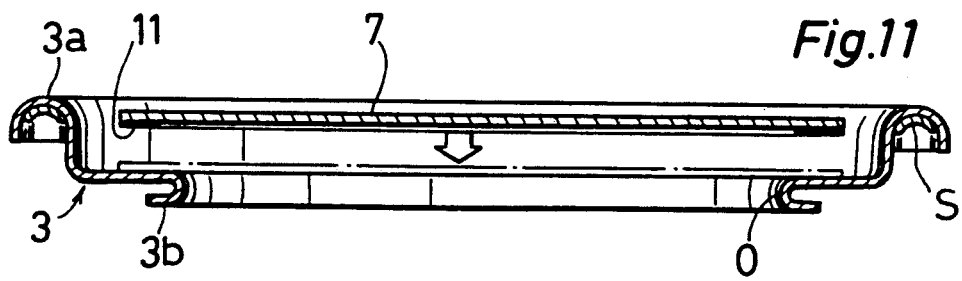

LID DEVICE FOR WIDE-MOUNTED CONTAINER AND METHOD OF PRODUCING THE SAME

BACKGROUND OF THE INVENTION

1. Field of the Invention

This invention relates generally to lids for containers, and more particularly to a pull-open type lid device for wide-mouthed containers such as cans wherein a pull tab of the lid device is manually pulled to open the lid for access the content of the container. The invention also relates to a method of producing such a lid device.

2. Description of the Prior Art

As is well known, a typical lid for wide-mouthed containers such as cans is made of a single metallic plate and formed with a looped weakening groove (a looped line of thin-walled portion) to define an easily openable portion. This openable portion is provided at a position adjacent to the weakening groove, with a metallic pull tab or ring which, when manually pulled up, causes the openable portion to be torn off from the rest of the lid along the weakening line.

Such a metallic lid is disadvantageous in that the respective torn edges of the openable portion and the resulting opening become sharpened, which may cause injury of the lips when drinking the content of the container or injury of the hand when making access into the container. Further, the sharp edge of the openable portion may accidentally come into injuring contact with various portions of the human body.

U.S. Pat. No. 4,674,649 to Pavely discloses a lid device which eliminates the safety problems after opening. Specifically, the lid device of this patent comprises a metallic can end or lid body having an aperture which is closed by a plastic closure member integrally molded in situ. The closure member is integrally formed with a pull tab which is used to tear-open the closure member along a weakening line. The aperture of the can end is defined by a downturned flange, so that no sharp edge is exposed after opening of the closure member which itself is safe because of its material.

However, the lid device according to the above U.S. patent is disadvantageous in the following respects.

First, cheap plastic materials such as polyethylene, which are now widely used and available in the market, have been found to be slightly pervious to vapor. Therefore, if the closure member is made of such a cheap material, the container cannot or should not be used for long storage of a moisture-rejective content such as milled coffee, powdered milk, salt or sugar because the content will be degraded by the environmental moisture getting into the container through the plastic closure member, or it will be excessively dried or lose fragrance by the contained moisture getting out through the closure member. Such a problem becomes more pronounced when the aperture to be closed by the closure member is increased in area.

It is of course possible to eliminate the above problem by increasing the thickness of the closure member to the degree enough to prevent vapor penetration or by using a vapor impervious resin such as polypropylene for molding the closure member. However, the former measure requires an increased amount of the plastic material to result in cost increase. The latter measure is similarly defective in that the vapor impervious resin is more costly than the vapor pervious resin. Further, the vapor impervious resin is relatively hard, resulting in difficulty in opening the closure member.

Secondly, it is very difficult to print various indications or patterns on the outer surface of the closure member which has been once molded in place relative to the lid body can end). In fact, such printing is often necessary to indicate various characteristics of the content or to improve visual attractiveness of the lid device as a whole. However, the only possibility found for the prior art closure member seems to be simultaneous formation of impressed patterns at the time of molding the closure member.

SUMMARY OF THE INVENTION

It is, therefore, an object of the present invention to provide a lid device which can be manufactured at a low cost but is yet capable of preventing the problem of content degradation while enabling printing of various indications and patterns.

Another object of the present invention to provide a lid device which can be repetitively used to open and close the container even after full opening of the container.

A further object of the present invention is to provide an optimum method of producing such a lid device.

According to one aspect of the present invention, there is provided a lid device for a wide-mouthed container comprising: a vapor impervious lid body fittable to an open mouth of the container, the lid body having an inner margin defining an opening of a predetermined shape; a closure member for closing the opening of the lid body, the closure member being integrally made of a soft synthetic resin, the closure member being formed with a weakening line extending along the inner margin of the lid body to define an openable portion, an externally loCated pull tab connected to the openable portion of the closure member at position adjacent the weakening line; and a vapor impervious film attached to cover substantially an entire outer surface of the closure member.

The point of the arrangement described above resides in that the resinous closure member itself needs not be vapor impervious because the protection against moisture passage is provided by the separate vapor impervious film covering the closure member. Therefore, the closure member may be thin and made of a cheap vapor pervious resin, thereby contributing greatly to cost reduction as a whole. The vapor impervious film reliably cuts off moisture passage through the closure member, thereby preventing the content of the container from being deteriorated by moisture entry or exit even after long storage. Further, the use of the plastic closure member eliminates the safety problems attendant with the wholly metallic lid.

The vapor impervious film can be prepared separately from the lid body and the closure member. Therefore, it is possible in advance to print various informative indications or attractive patterns on the film. Further, the attachment of the film to the closure member can be conducted as part of a molding step for forming the closure member, as hereinafter described.

According to another aspect of the invention, there is provided a method of producing a lid device for a wide-mouthed container, the lid device comprising: a lid body fittable to an open mouth of the container, the lid body having an inner margin defining an opening of a predetermined shape; and a closure member made of a soft synthetic resin for closing the opening of the lid body, the closure member having an openable portion integrally formed with a pull tab which is used for opening the openable portion; the method comprising the steps of: attaching a vapor impervious film to the lid body to close the opening on an outer side thereof; placing the lid body together with the film in a mold which include a first mold body having a closure forming cavity on an inner side of the opening of the lid body, and a second mold body having a tab forming cavity on the outer side of the opening of the lid body; and injecting a fluid synthetic resin under a pressure into the closure forming cavity until the fluid resin fills the closure forming cavity and the tab forming cavity, the fluid resin penetrating the film when filling the tab forming cavity.

With the method described above, the vapor impervious film needs only be attached to the lid body in advance, and the closure member is molded in situ relative to the lid body. During such molding, the film is simultaneously attached to closure member by the inherent stickiness of the fluid resin. Further, the fluid resin supplied under pressure penetrates the film at the tab forming cavity which is subsequently filled with the fluid resin to form the pull tab integral with the closure member. In this way, the lid device can be manufactured very easily at a relatively low cost.

Other objects, features and advantages of the present invention will become apparent from the following detailed description of the preferred embodiments given with reference to the accompanying drawings.

BRIEF DESCRIPTION OF THE DRAWINGS

In the accompanying drawings:

FIG. 1 is perspective view showing a wide-mouthed container which is closed by a lid device embodying the present invention;

FIG. 2 is a sectional view taken on lines II—II in FIG. 1 to show the same lid device in its closed condition;

FIG. 3 is a sectional view similar to FIG. 2 but showing the lid device in its open condition;

FIG. 4 is an enlarged fragmentary sectional view showing an example of vapor impervious film to be incorporated into the lid device;

FIG. 5 is a top plan view showing another lid device embodying the present invention;

FIG. 6 is a sectional view taken on lines VI—VI in FIG. 5 to show the lid device in its open condition;

FIG. 7 is a fragmentary sectional view showing a further lid device embodying the present invention;

FIG. 8 is a top plan view showing still another lid device embodying the present invention;

FIG. 9 is a sectional view taken on lines IX—IX in FIG. 8 to show the lid device in its closed condition;

FIG. 10 is a sectional view similar to FIG. 9 but showing the lid device in its open condition;

FIGS. 11 to 13 are sectional views showing the process steps for producing the lid device shown in FIGS. 1 to 3;

DETAILED DESCRIPTION OF THE PREFERRED EMBODIMENTS

Figure 12:
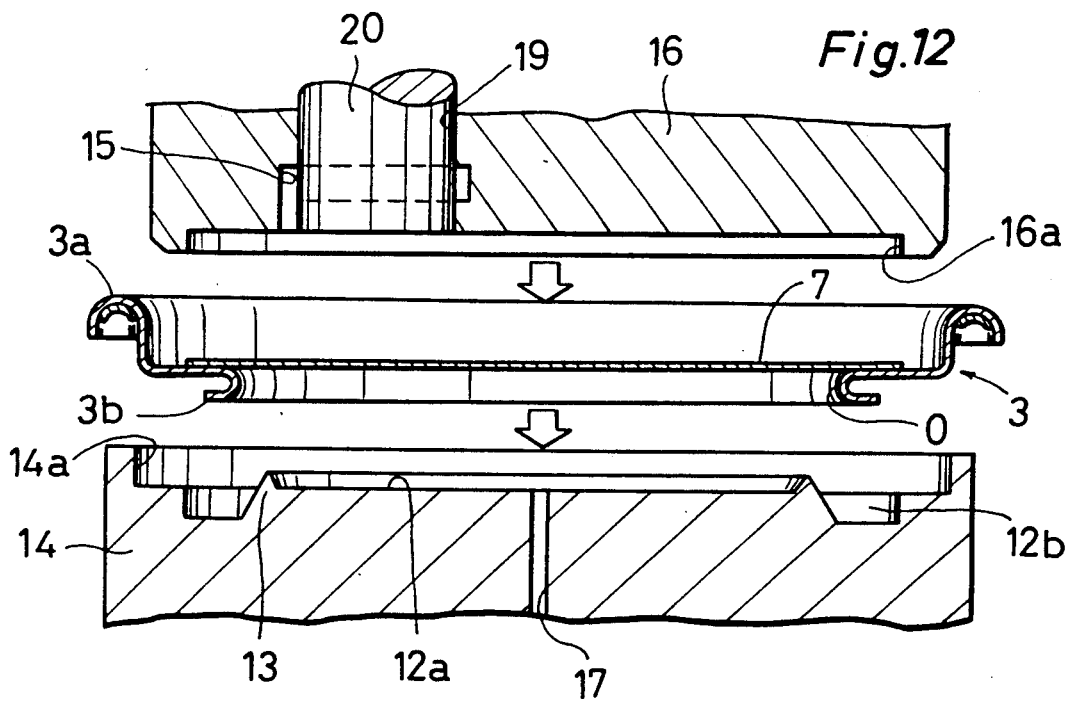

Referring first to FIGS. 1 to 4 of the accompanying drawings, there is illustrated a wide-mouthed container 1 which is closed at its top open mouth 1a by a lid device 2 according to the present invention. The container is bottomed and may be made of a known suitable material such for example as metal or synthetic resin.

The lid device 2 includes a lid body 3 formed to define a concentric opening 0 which is normally closed by a closure member 4. According to the particular embodiment illustrated in FIGS. 1 to 4, the lid body 3 assumes only a peripheral portion of the lid device 2, whereas the closure member 4 assumes a substantial central portion of the lid device. However, the lid body 3 may be made to assume a substantial portion of the lid device 2 with a small central or offset opening which is closed by the closure member 4 which is rendered much smaller than illustrated.

The lid body 3, which is made of a thin metal plate, has an outer mounting margin 3a which is shaped in an inverted U for fitting to the top open mouth 1a of the container 1 by a known method such as hemming or caulking. A packing S made of rubber or other soft material is interposed between the lid mounting margin 3a and the container mouth 1a to hermetically seal the interior of the container. The lid body 3 further has a bent inner margin 3b for connection to the closure member 2. This inner margin 3b of the lid body defines the opening 0 described above.

The closure member 4 is an integral piece made of a soft synthetic resin such as polyethylene. The closure member has a central openable portion 4a, and an enlarged outer margin 4b which is enclosingly connected to the inner margin 3b of the lid body 3. A looped weakening line provided by a V-shaped groove 5 is formed on the inner surface (lower surface) of the closure member entirely along the open inner margin 3b of the lid body 3 to provide a boundary between the central portion 4a and the outer margin 4b. The central portion 4a is integrally formed with a pull tab or ring 6 located adjacent to the weakening line 5.

Obviously, because the inner margin 3b of the lid body 3 is bent radially outward and entirely enclosed in the enlarged outer margin 4b of the closure member 4, it is possible to firmly fix the closure member to the lid body.

The outer surface (upper surface) of the closure member 4 is entirely covered by an aluminum foil 7 which is an example of vapor impervious film. The aluminum foil is penetrated by a base portion 6a of the pull ring 6, and has a riser portion 7b attached to the pull ring base portion 6a.

Preferably, the aluminum foil 7 is coated or laminated on both surfaces with layers 8 of synthetic resin, as shown in FIG. 4. The total thickness t of the foil including the coated or laminated layers 8 may be about 50 micrometers.

According to the arrangement described above, the closure member 4 itself may be made of an inexpensive vapor pervious material such as polyethylene. The thickness T of the closure member may be small because the water vapor passage through the closure member into and from the container 1 can be prevented by the aluminum foil 7. Thus, the lid device 2 of the present invention can be manufactured at a low cost while enabling the container to be stored for a long period without the content of the container being deteriorated by the moisture or excessively dried.

Further, the aluminum foil 7 can be prepared separately from the lid body 3 or the closure member 4 and therefore allows printing of various indications or patterns prior to its attachment to the lid device 2, thereby enhancing the visual attractiveness of the lid device. Particularly, such printing can be facilitated when the aluminum foil 7 is provided with the layers 8 of synthetic resin.

For opening the thus closed container 1, the pull ring 6 of the lid device 2 needs only be pulled up manually. This results in that the central portion 4a of the closure member 4 is torn off the outer margin 4b thereof along the weakening groove 5. Further, the marginal portion 7a of the aluminum foil 7 is peeled off the outer margin 4b of the closure member 4, as shown in FIG. 3. The looped or completely circular weakening line 5 makes it possible to wholly remove the central portion 4a of the closure member, thereby facilitating immediate take-out of the whole content.

FIGS. 5 and 6 show another lid device 30 which differs from the previously described lid device 2 only in that a closure member 4' is formed with a non-looped or incompletely circular weakening line 5'. This weakening line ensures that the central portion 4a' of the closure member remains connected to the enlarged outer margin 4b' thereof even after substantially full opening of the lid device. Thus, the central portion 4a' can be used as a pivotal closure flap which enables divisional take-out of the content. Further, after complete take-out of the whole content, the emptied container (not shown in FIGS. 5 and 6) may be used to store a different substance which does not require strict storing conditions.

FIG. 7 illustrates still another lid device 40 which differs from the foregoing lid devices 2, 30 only in that an aluminum foil 7' has a marginal portion 7a' extending radially beyond the enlarged outer margin 4b (4b') of the closure member 4 (4') for direct attachment to the lid body 3 as by an adhesive. Obviously, the marginal portion 7a' of the aluminum foil covers the outer circumferential surface of the enlarged outer margin 4b. Therefore, this modified arrangement provides a more reliable prevention against vapor passage through the closure member 4 (4').

FIGS. 8 to 10 show a further lid device 50 according to the present invention. This lid device comprises a lid body 3' and a plug-type closure member 4".

The lid body 3' has an outer mounting margin 3a' which is shaped in an inverted U for mounting to the top open mouth of a container (not shown). The inner margin of the lid body includes a diametrically smaller cylindrical portion 3b' and a diametrically larger cylindrical portion 3c' with an engaging shoulder or step 9 formed therebetween. The smaller cylindrical portion 3b' defines a closable opening 0. The larger cylindrical portion 3c' has a sharpened extremity 3d' for the purpose to be described later.

The closure member 4" has a central portion 4a" formed integrally with an annular plugging portion 4b" which in turn is formed integrally with an annular retainer portion 4c". The plugging portion 4b" is located radially inside the inner margin of the lid body 3' for engagement with the engaging shoulder 9. The retainer portion 4c" is located radially outside the inner margin of the lid body for fitting therearound. The boundary between the plugging portion 4b" and the retainer portion 4c" is provided by a looped weakening line 10 which is thin-walled due to the presence of the sharpened extremity 3d' of the lid body.

Similarly to the foregoing embodiments, the outer surface (upper surface) of the closure member 4" is entirely covered by an aluminum foil 7 which has a riser portion 7b. The foil may extend radially for direct attachment to the lid body 3', as shown in FIG. 7.

In use, the pull ring 6 is manually pulled up to cause tearing at the weakening line 10, thereby enabling removal of the plugging portion 4b" from the opening 0 of the lid body 3', as shown in FIG. 10. The thus removed closure member 4" may be re-inserted into the opening 0 of the lid body, and retained therein by utilizing engagement between the engaging shoulder 9 of the lid body and the plugging portion 4b" of the closure member.

The plug-type closure member 4" is an integral piece formed in situ relative to the lid body 3, as hereinafter described. Therefore, the once removed closure member retains exact dimensional relation required for close but not too tight fitting thereof into the lid body. The offset location of the pull ring 6 enables easy removal of the closure member.

The lid device 2 shown in FIGS. 1 to 3 is produced in the following manner.

First, the aluminum foil 7 is attached by an adhesive 11 to the upper surface of the lid body 3 to close the opening 0 thereof, as shown in FIG. 11.

Figure 14:
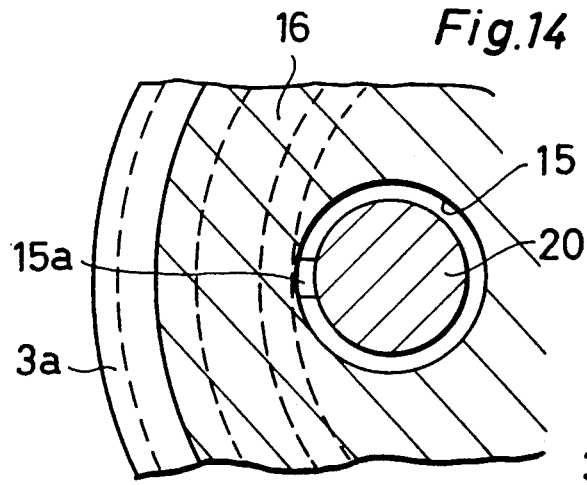
FIG. 14 is a sectional plan view taken on lines XIV—XIV in FIG. 13.

Subsequently, the lid body together with the aluminum foil is interposed between a first (lower) mold body 14 and a second (upper) mold body 16, as shown in FIG. 12. The first mold body 14 has a seating cavity 14a for receiving the lid body 3. For molding the closure member 4 (see FIG. 2), the first mold body further has a central cavity portion 12a and an annular marginal cavity portion 12b separated from the central cavity by an annular V-shaped projection 13. The second mold body 16 has a foil receiving cavity 16a and a ring or tab forming cavity 15 which includes an inlet portion 15a. The ring forming cavity 15 is connected to a core guide bore 19 for slidably receiving a movable core 20. Thus, an annular clearance is formed around the core within the ring forming cavity 15, as best shown in FIG. 14.

Figure 13:
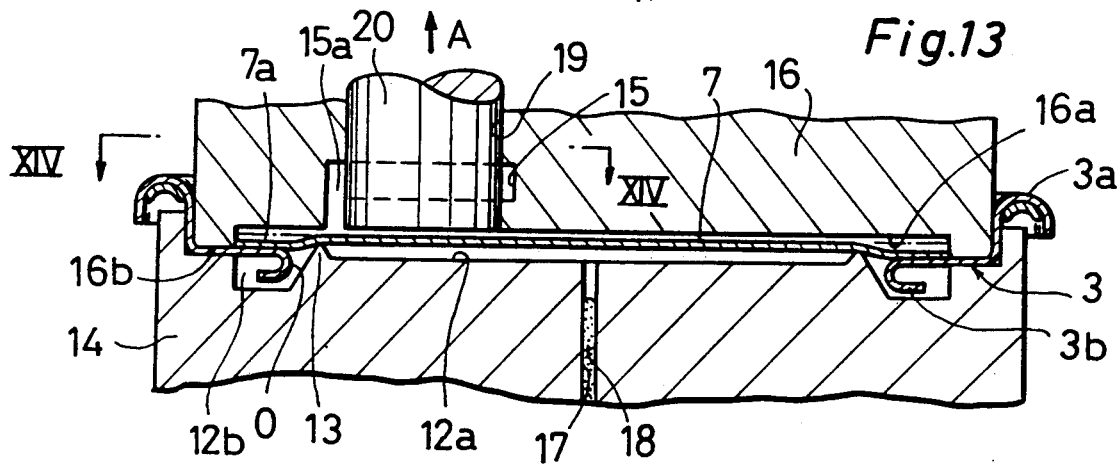
Figure 15:
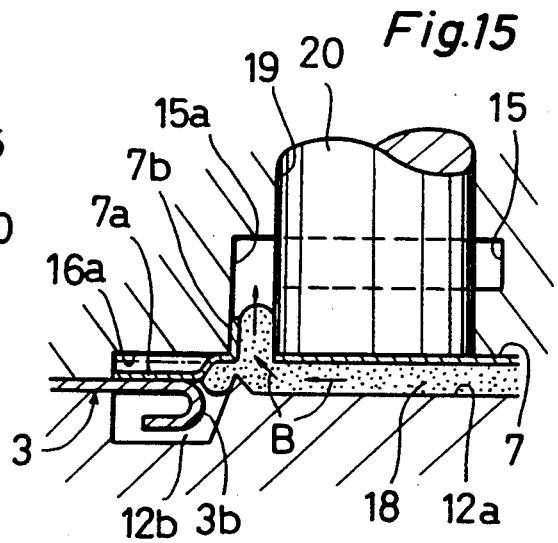
FIG. 15 is an enlarged fragmentary sectional view similar to FIG. 13 but showing the flow of a fluid resin.

Finally, a fluid synthetic resin 18 is injected under a high pressure through a runner 17 of the first mold 14, as shown in FIG. 13. As a result, the fluid resin 18 flows into the central cavity portion 12a of the first mold body, and presses the aluminum foil 7 against the wall of the foil receiving cavity 16a, as shown in FIG. 15. At the inlet portion 15a of the ring forming 15, there is no support for the foil 7. Thus, when reaching the inlet portion 15a of the ring forming cavity 15, the fluid resin penetrates through the foil 7 because of the high pressure for resin injection to fill the ring forming cavity, thereby forming the pull ring 6 (see FIG. 2). The fluid resin further flows into the marginal cavity portion 12b of the first mold body 14. Ultimately, the fluid resin finds its way between the lid body 3 and the foil margin 7a by peeling the foil margin off the lid body, as indicated by phantom lines in FIG. 15.

In this way, the closure member 4 integral with the pull ring 6 is molded into a predetermined shape. As a result of such molding, the foil 7 is firmly adhered to the entire outer surface of the closure member 4 without use of any adhesive because the fluid resin 18 itself serves as an adhesive due to its inherent stickiness.

After hardening of the resin 18, the core 20 is slidably retreated to leave the pull ring 6, as indicated by an arrow A in FIG. 13. Finally, the mold 14, 16 is opened to provide the lid device 2.

In the above method, the fluid resin 18 is injected generally at the central portion of the closure forming cavity 12a, 12b of the first mold body 14. This causes the fluid resin to flow radially outward in the closure forming cavity, as indicated by arrows B in FIG. 15. Thus, upon penetrating the foil 7 at the inlet portion 15a of the ring forming cavity 15, the resin starts applying its pressure at the edge of the cavity inlet portion 15a closer to the center of the closure forming cavity to cause tearing of the foil at this position, and thereafter forces the torn portion 7b of the foil to be raised away from the center of the closure forming cavity.

As a result of such a manner of resin injection, the riser portion 7b of the foil 7 is formed as attached to the base portion 6a of the pull ring 6 on the side thereof away from the center of the lid device 2, as shown in FIG. 2. This foil riser portion 7b provides a strong connection or attachment to the ring base portion 6a adjacent to the foil marginal portion 7a. Therefore, when the pull ring 6 is pulled up to open the lid device 2 (see FIG. 3), the foil marginal portion 7a remains integral with the rest of the foil without tearing at the weakening line 5, thereby preventing the foil marginal portion 7a from staying attached to the enlarged outer margin 4b of the closure member 4. In this way, the appearance of the lid device 2 will be kept still good even after opening.

The lid device 30 shown in FIGS. 5 and 6 can be manufactured in the same manner as described above. However, the first mold body 14 must be modified so that the V-shaped projection 13 extends along only a part of a circle.

The lid device 40 shown in FIG. 7 can be produced by using the same mold as shown in FIGS. 12 to 15. However, in this case, the aluminum foil 7' having a diameter larger than that of the closure member 4 (4') is attached to the lid body 3, and subsequently the second mold body 16 (see FIG. 13) is fitted so that the marginal portion 7a' of the foil is interposed between the lid body and an annular pressing surface 16b of the second mold body.

Figure 16:
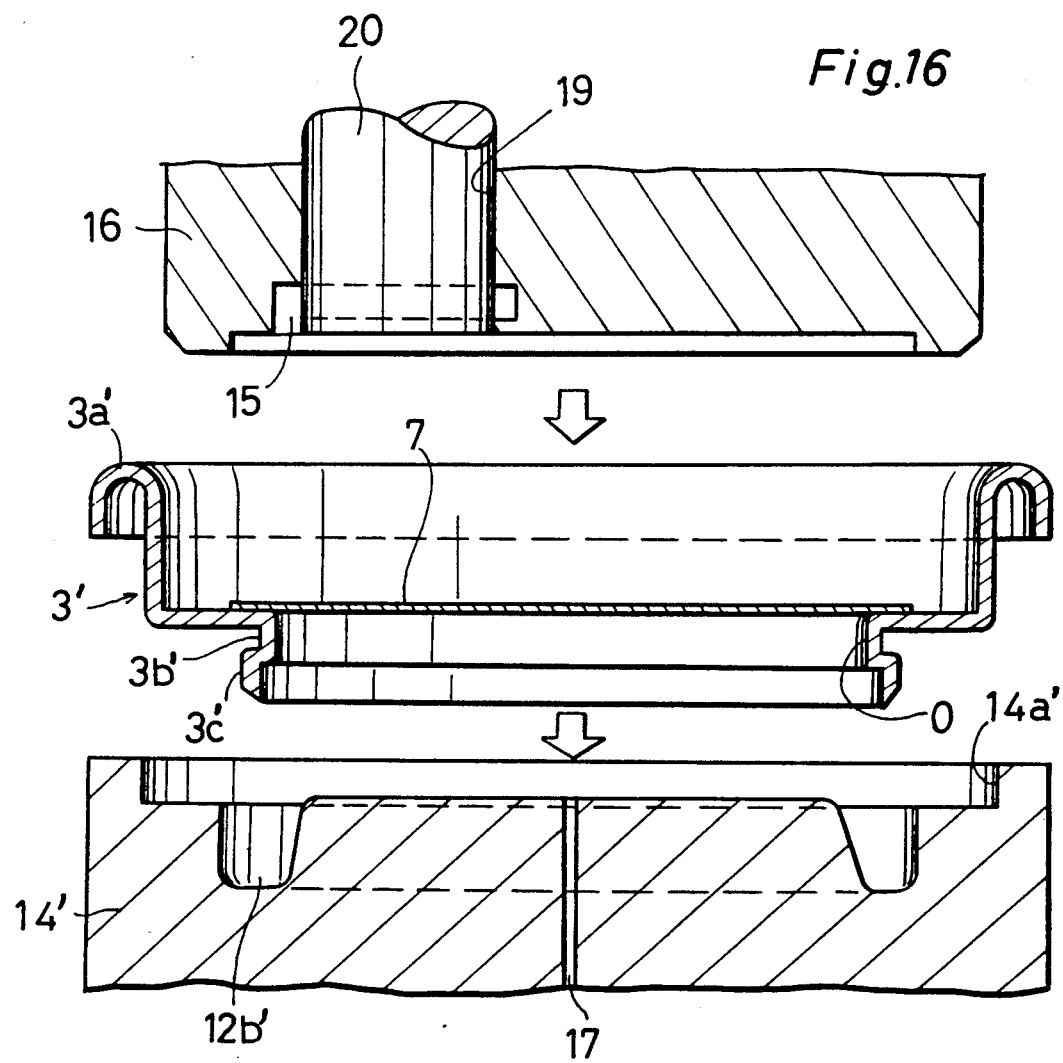
FIGS. 16 and 17 are sectional views showing the process steps for producing the lid device shown in FIGS. 8 to 10.
Figure 17:
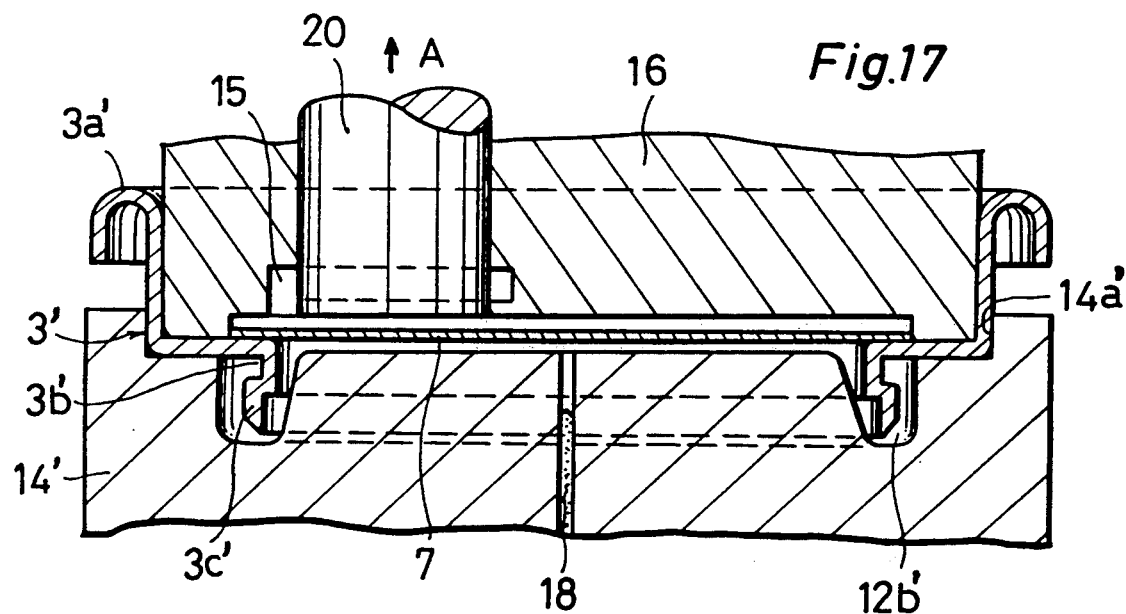

FIGS. 16 and 17 show a method of producing the lid device 50 of FIGS. 9 and 10 by using another mold which includes a first mold body 14' and a second mold body 16. The second mold body 16 including a movable core 20 is substantially identical to that illustrated in FIGS. 12 to 15. The first mold 14' has a seating cavity 14a' which serves also as a closure forming cavity in addition to receiving the lid body 3', as appreciated from FIG. 17. The seating or closure forming cavity 14a' includes an annular marginal cavity portion 12b' for molding the enlarged outer margin of the closure member 4".

Obviously, the lid device 50 of FIGS. 9 and 10 is fabricated in substantially the same manner as already described with reference to FIGS. 11 to 15. Therefore, the specific sequence of the manufacturing process is not described with respect to FIGS. 16 and 17.

In any of the foregoing embodiments, the aluminum foil 7 (7') is used as an example of vapor impervious film. However, the aluminum foil may be replaced by a different metallic foil or a vapor impervious resin film such as nylon or polypropylene. When using a metallic foil, it should be preferably coated on each surface with a layer 8 of synthetic resin because such a coating will improve printability thereon and adherence to the closure member. Particularly, when the foil is coated with a layer of the same resin as used for molding the closure member, the adherence of the foil to the closure member is most effectively improved.

Figure 18:
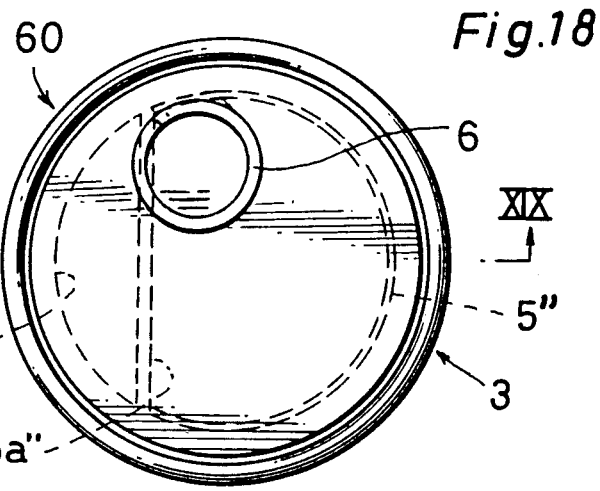
FIG. 18 is a top plan view showing still another lid device embodying the present invention.
Figure 19:
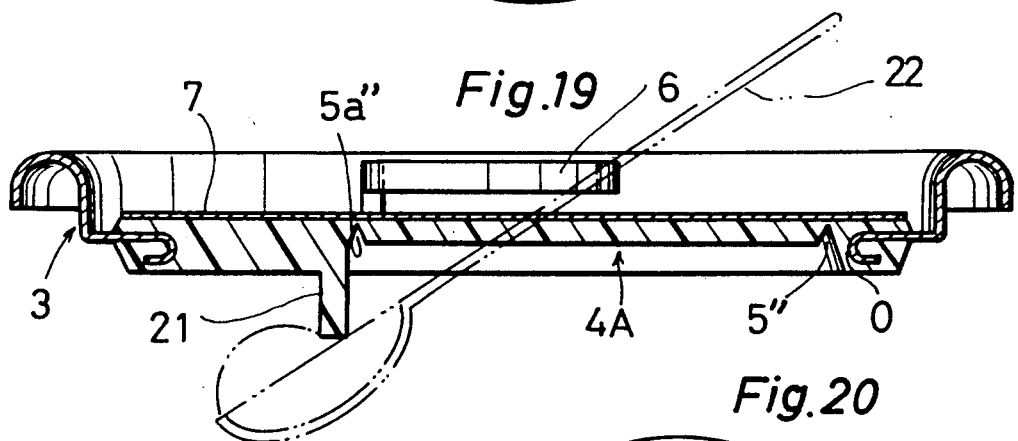
FIG. 19 is a sectional view taken on lines XIX-XIX in FIG. 18.

FIGS. 18 and 19 show another embodiment wherein a lid device 60 comprises a closure member 4A which is openable along a looped weakening line 5" including a straight portion 5a". The closure member is further formed on its inner surface with a scraping projection 21 which is positioned outwardly adjacent to the looped weakening line 5" and extends along the straight portion 5a".

The arrangement shown in FIGS. 18 and 19 is particularly advantageous when used for a container (not shown) of a granulated or powdered substance such as powdered milk. In use, a measuring spoon 22 may be introduced into the open container to first scoop an excessive amount of the milk powder for example (see FIG. 19), and the excessive portion is scraped off from the spoon 22 by utilizing the scraping projection 21. It is thus possible to obtain a measured amount of the powdered milk.

Figure 20:
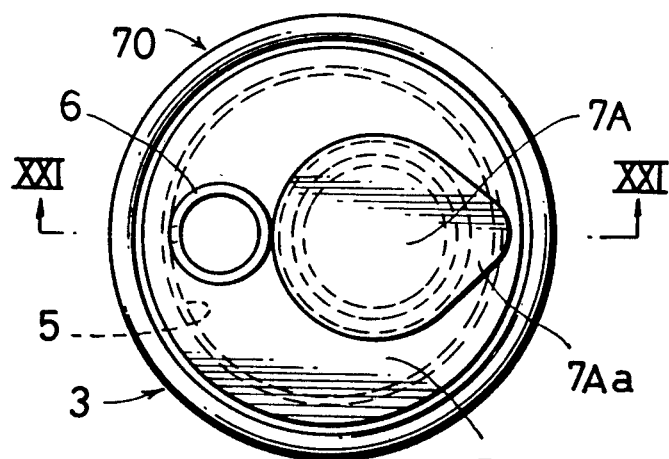
FIG. 20 is a top plan view showing a still further lid device embodying the present invention.
Figure 21:
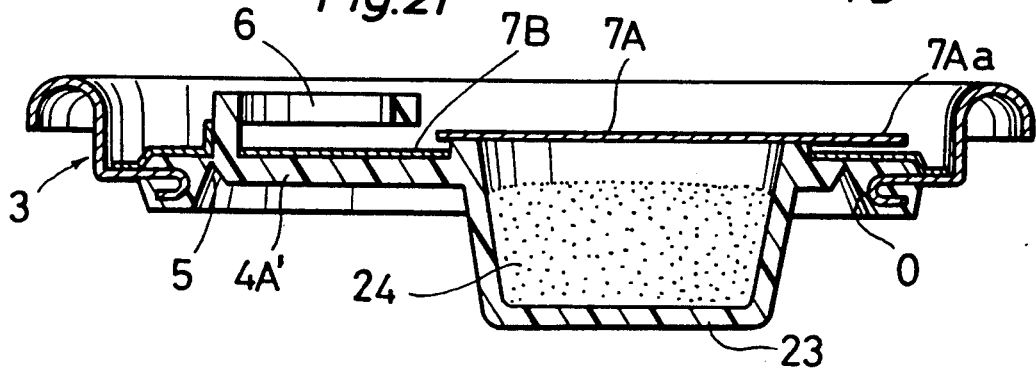
FIG. 21 is a sectional view taken on lines XXI-XXI in FIG. 20.

FIGS. 20 and 21 show a further embodiment wherein a lid device 70 comprises a closure member 4A' which is formed with an auxiliary container 23 for receiving an additional substance 24 such as coffee milder milk. The auxiliary container 23 is closed by a first film 7A, whereas the remaining portion of the closure member is covered by a second film 7B. The first film 7A has an extended tab edge portion 7Aa for facilitating peeling off the first film from the open mouth of the auxiliary container 23. Both films are vapor impervious, and may be made of aluminum foils each of which may be coated with layers of synthetic resin.

The present invention being thus described, it is obvious that the same may be varied in many other ways. For instance, the pull tab may be formed to have a T-shape instead of a ring-shape. Further, the metallic lid body 3 (3') may be coated on all or partial surfaces thereof with a layer of the same resin as used for molding the closure member 4, (4', 4", 4A, 4A') to strengthen the connection between the lid body and the closure member. Such variations are not to be regarded as a departure from the spirit and scope of the the invention, and all such modifications as would be obvious to those skilled in the art are intended to be included within the scope of the following claims.

I claim:

1. A lid device for a wide-mouthed container comprising:
    a lid body fittable to an open mouth of the container, said lid body having an inner margin defining an opening of a predetermined shape;
    a closure member for closing said opening of said lid body, said closure member being integrally made of a soft synthetic resin, said closure member being formed with a weakening line extending along said inner margin of said lid body to define an openable portion; and an externally located pull tab connected to said openable portion of said closure member at a position adjacent to said weakening line; wherein said inner margin of said lid body has a bent portion directed radially outward; and said closure member has an anchoring portion located radially outwardly of said weakening line, said anchoring portion completely enclosing said inner margin, including said bent portion, of said lid body for connection thereof; whereby said anchoring portion remains entirely connected to said inner margin even when said openable portion is tear-opened along said weakening line.

2. The lid device as defined in claim 1, wherein said lid body is made of a metallic plate.

3. The lid device as defined in claim 1, wherein said weakening line forms a loop extending along the entirety of said anchoring portion of said closure member.

4. The lid device as defined in claim 1, wherein said weakening line forms a non-loop extending along said anchoring portion of said closure member for a predetermined length.

5. The lid device as defined in claim 1, wherein said weakening line is provided by a groove formed on an inner surface of said closure member.

6. The lid device as defined in claim 5, wherein said groove is V-shaped.

7. The lid device as defined in claim 1, further comprising a vapor impervious film means attached to cover substantially an entire outer surface of said closure member.

8. The lid device as defined in claim 7, wherein said pull tab is formed integrally with said openable portion of said closure member.

9. The lid device as defined in claim 8, wherein said film means is penetrated by a base portion of said pull tab and has a riser portion which is attached to said base portion on the side thereof away from the center of the lid device.

10. The lid device as defined in claim 7, wherein said film means is radially extended beyond said outer surface of said closure member for direct attachment to said lid body.

11. The lid device as defined in claim 7, wherein said film means is in the form of a metallic foil sandwiched between two layers of synthetic resin.

12. The lid device as defined in claim 7, wherein said closure member is made of a vapor pervious resin.

13. The lid device as defined in claim 7, wherein said openable portion of said closure member is integrally formed with an auxiliary container; and said film means comprises a first film for covering an open mouth of said auxiliary container, and a second film for covering the entire remaining portion of the closure member.

14. The lid device as defined in claim 1, wherein said weakening line is looped but has a straight portion; and said closure member has an inner surface integrally formed with a scraping projection which is positioned outside the looped weakening line to extend along said straight portion.

15. A lid device for a wide-mouthed container comprising:

a lid body fittable to an open mouth of the container, said lid body having an inner margin defining an opening of a predetermined shape;

a closure member for closing said opening of said lid body, said closure member being integrally made of a soft synthetic resin, said closure member being formed with a weakening line extending along said inner margin of said lid body to define an openable portion; and an externally located pull tab connected to said openable portion of said closure member at a position adjacent said weakening line; wherein said closure member has an outer margin enclosing said inner margin of said lid body for connection thereto;

said weakening line is looped and located at said outer margin of said closure member;

said inner margin of said lid body has a diametrically smaller cylindrical portion, and a diametrically larger cylindrical portion separated from said smaller cylindrical portion by an engaging step; and said outer margin of said closure member has a plugging portion located radially inwardly of said inner margin of said lid body for engagement with said engaging step, and a retainer portion integrally connected to said plugging portion via said weakening line and located radially outwardly of said inner margin of said lid body; whereby said openable portion of said closure member includes said plugging portion to work as a plug re-insertable into said opening of said lid body even after opening of the lid device.

16. The lid device as defined in claim 15, wherein said larger cylindrical portion of said lid body has a sharpened extremity to form a thin-walled portion of said outer margin of said closure member, said weakening line being provided by said thin-walled portion.

* * * * *